United States Patent
Jones et al.

(10) Patent No.: US 11,595,193 B2
(45) Date of Patent: Feb. 28, 2023

(54) SECURE DATA STORAGE FOR ANONYMIZED CONTACT TRACING

(71) Applicant: VMware, Inc., Palo Alto, CA (US)

(72) Inventors: Perron Jones, Atlanta, GA (US); Yijia Zhao, Cupertino, CA (US); Edward Burns, Bastrop, TX (US); Christian Lita, Lakeway, TX (US)

(73) Assignee: VMWARE, INC., Palo Alto, CA (US)

( * ) Notice: Subject to any disclaimer, the term of this patent is extended or adjusted under 35 U.S.C. 154(b) by 76 days.

(21) Appl. No.: 16/940,336

(22) Filed: Jul. 27, 2020

(65) Prior Publication Data

US 2022/0014357 A1 Jan. 13, 2022

Related U.S. Application Data (60) Provisional application No. 63/050,328, filed on Jul. 10, 2020.

(51) Int. Cl.
*H04L 9/08* (2006.01)
*H04L 41/22* (2022.01)
(Continued)

(52) U.S. Cl.
CPC .......... *H04L 9/0825* (2013.01); *H04L 9/0643* (2013.01); *H04L 9/0894* (2013.01);
(Continued)

(58) Field of Classification Search
None
See application file for complete search history.

(56) References Cited

U.S. PATENT DOCUMENTS 8,364,713 B2  1/2013  Pollard
9,497,197 B2  11/2016  Kus et al.
(Continued)

FOREIGN PATENT DOCUMENTS

KR    20180010434 A    1/2018

OTHER PUBLICATIONS

Chowdhury et al., "COVID-19 Contract Tracing: Current States and Future Directions," Preprints, Jun. 19, 2020, doi: 10.20944/preprints202006.0240.v1. pp. 1-32.
(Continued)

*Primary Examiner* — Bassam A Noaman
(74) *Attorney, Agent, or Firm* — Thomas Horstemeyer, LLP (57) ABSTRACT

A network environment is described for securely storing data for anonymized contact tracing while an application is executing in a background state. An application can receive a message containing data while the application is executing in a background state. The data is encrypted using a public key. Next, the application can store the encrypted data in an alternate data store. Subsequently, and upon user authentication, the application can decrypt a secure data store decrypt the encrypted data. The application can then store the decrypted data in the decrypted secure data store. The application can receive user input indicating a positive test result for a communicable disease with an incubation period, and anonymously upload the data stripped of any uniquely identifying information.

20 Claims, 5 Drawing Sheets

(51) Int. Cl.
  *H04L 9/32* (2006.01)
  *H04L 9/06* (2006.01)
(52) U.S. Cl.
  CPC .......... *H04L 9/3242* (2013.01); *H04L 9/3297* (2013.01); *H04L 41/22* (2013.01)

(56) References Cited

U.S. PATENT DOCUMENTS

| | | | |
|---|---|---|---|
| 10,356,591 B1* | 7/2019 | Tengwall | H04W 4/08 |
| 2015/0310220 A1* | 10/2015 | Brooks | G06F 9/543 |
| | | | 713/189 |
| 2016/0086176 A1* | 3/2016 | Silva Pinto | G06Q 20/321 |
| | | | 705/44 |
| 2018/0107418 A1* | 4/2018 | Umeda | G06F 3/0619 |
| 2018/0129537 A1* | 5/2018 | Kurtzman | G06F 9/5083 |
| 2018/0189107 A1* | 7/2018 | Bai | G06F 9/5027 |
| 2018/0285602 A1* | 10/2018 | Mersh | G06F 21/33 |
| 2019/0065711 A1* | 2/2019 | Seo | G06F 21/31 |
| 2020/0218813 A1* | 7/2020 | Gedliczka | G06F 21/602 |
| 2020/0285774 A1* | 9/2020 | White | G06F 9/45558 |
| 2020/0401963 A1* | 12/2020 | Matuchniak | H04L 51/04 |
| 2021/0319045 A1* | 10/2021 | Iserson | G06F 16/285 |

OTHER PUBLICATIONS

Rajan et al., "A Note on Cryptographic Algorithms for Private Data Analysis in Contact Tracing Applications," arXiv:2005.10634v1, May 2020. pp. 1-12.
International Search Report dated Sep. 30, 2021.

* cited by examiner

SECURE DATA STORAGE FOR ANONYMIZED CONTACT TRACING

CROSS-REFERENCE TO RELATED APPLICATIONS

This application claims priority to, and the benefit of, U.S. Provisional Patent Application No. 63/050,328, entitled "SECURE DATA STORAGE FOR ANONYMIZED CONTACT TRACING" and filed on Jul. 10, 2020, which is incorporated by reference as if set forth herein in its entirety.

BACKGROUND

Epidemic disease spread can often be minimized through the use of contact tracing, whereby everyone that an infected individual comes into contact with is identified and notified of their potential exposure. While this process has traditionally been done manually, large scale or fast-spreading epidemics can make contact tracing difficult or practically infeasible. Applications installed on computer and mobile devices can be used to automate contact tracing, but these applications often present privacy concerns for the users due to type and amount of data collected.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for a contact tracing application that can use secure data storage to preserve the anonymity and privacy of individual users. A contact tracing application can be installed on a user's mobile device. As a user comes into contact with various beacons or other radio transmitters, the location, time, and identifier of the transmitter is recorded, as well as potentially other information. Should the user test positive for a communicable disease, the user can voluntarily upload a list of beacons that he or she has been in proximity to. The list of beacons can be redistributed anonymously to other users, where a local evaluation can be performed on the other users' mobile devices to determine whether other uses may have been potentially exposed. Because the information collected by the contract tracing application is sensitive, its collection may be performed securely to preserve user privacy and prevent exposure of user location data to other applications. However, the techniques used by the contact tracing application to securely collect and store data could also be used by other types of applications to securely collect and store data.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
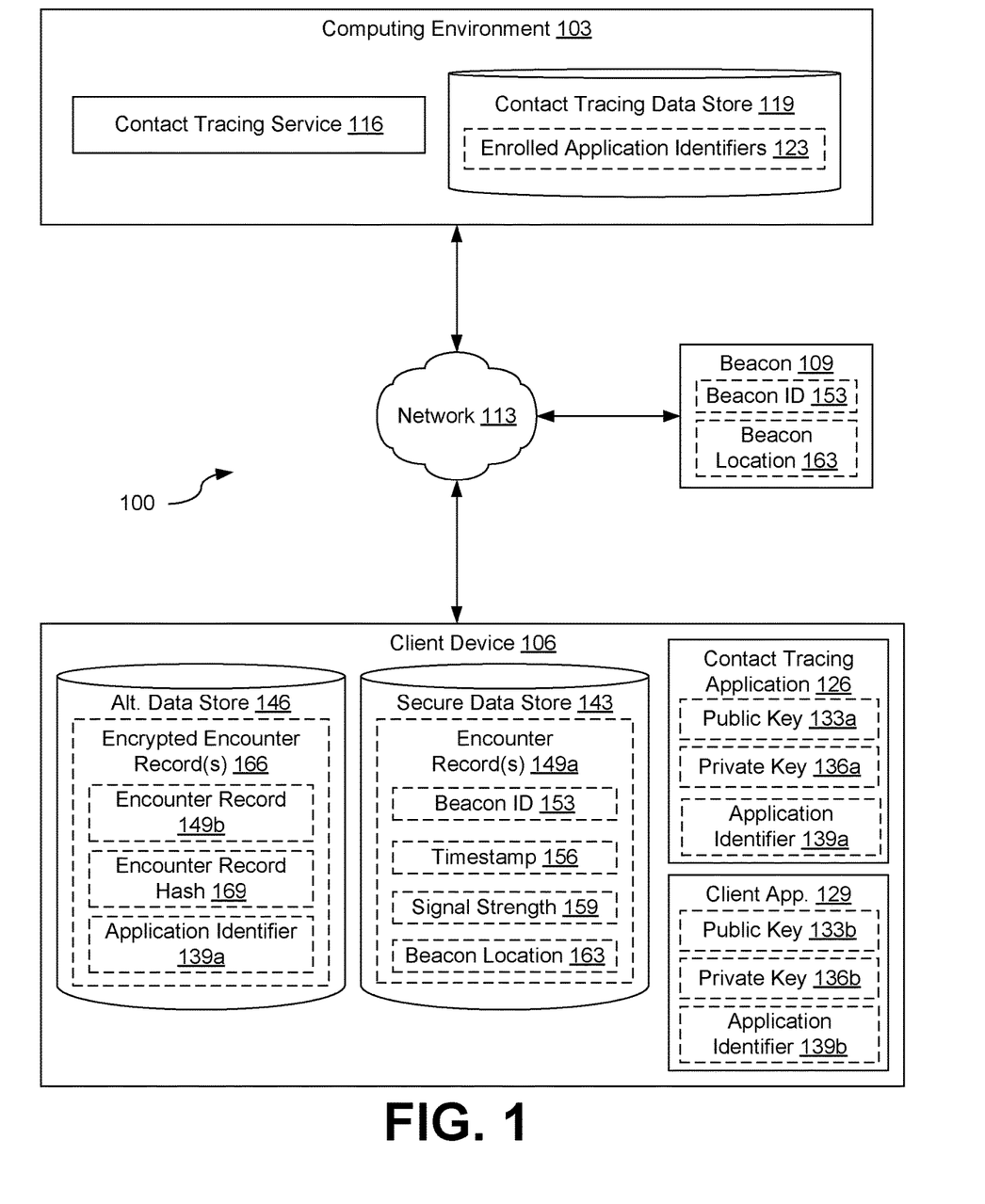
FIG. 1 is a drawing of a network environment according to various embodiments of the present disclosure.

With reference to FIG. 1, shown is a network environment 100 according to various embodiments. The network environment 100 can include a computing environment 103, one or more client devices 106, and one or more beacons 109, which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a contact tracing service 116, and other applications, services, processes, systems, engines, or functionality not discussed in detail herein.

The contact tracing service 116 can be executed to register or enroll client devices 106 to receive updates from the contact tracing service 116 and to relay information about infected individuals. For example, the contact tracing service 116 could be executed to receive location data from a client device 106 when a user chooses to upload his or her location data as a result of receiving a positive test result for an infectious or communicable disease. Once the location data is received, the contact tracing service 116 could relay or redistribute the location data to other client devices 106 enrolled with the contact tracing service 116. To preserve user privacy, the contact tracing service 116 can be configured to avoid storing any location data received from client devices 106.

Also, various data is stored in a contact tracing data store 119 that is accessible to the computing environment 103. The contact tracing data store 119 can be representative of a plurality of contact tracing data store 119, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the contact tracing data store 119 is associated with the operation of the various applications or functional entities described below. This data can include a list of enrolled application identifiers 123, and potentially other data.

The enrolled application identifiers 123 can represent a list of client devices 106 that have enrolled with the contract tracing service 116. To preserve user anonymity, device generated identifiers can be used to identify the client device 106 instead of immutable identifiers for client devices 106 (e.g., hardware serial numbers, international mobile equipment identifier (IMEI) numbers, media access control (MAC) addresses, etc.). The device generated identifiers can be periodically recreated or updated in order to maintain a unique identifier for enrolled client devices 106 while minimizing a correlation between any specific identifier and a specific client device 106.

The client device 106 is representative of a plurality of client devices that can be coupled to the network 113. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as a contract tracing application 126 or other client applications 129. The contact tracing application 126 can be configured to collect or receive location data from beacons 109 and, if a user opts to do so, share the collected location data from the beacons 109 with the contact tracing service 116. Likewise, if the contact tracing application 126 receives location data from the contact tracing service 116, the contact tracing application 126 can determine the likelihood that a user was exposed to another use infected with a communicable disease. If there was a possibility of exposure, the contact tracing application 126 could render a notification on the display of the client device 106. One or more client application(s) 129 can also be executed in a client device 106 to access network content served up by the computing environment 106 or other servers, thereby rendering a user interface on the display. To this end, the client application 129 can include a browser, a dedicated application, or other executable, and the user interface can include a network page, an application screen, or other user mechanism for obtaining user input. The client device 106 can be configured to execute applications beyond the client application 129 such as email applications, social networking applications, word processors, spreadsheets, or other applications.

Each application installed on a client device 106, such as a contact tracing application 126 or a client application 129, may have various data associated with it. For example, each application may have a public key 133 and a respective private key 136 (illustrated as public key 133a, 133b, . . . and private key 136a, 136b, . . . ). The public key 133 and respective private key 136 can be used to by an application to encrypt data received from other sources or store data in an encrypted form that can only be decrypted with the respective private key 136 of the application.

One or more data stores may also be hosted in the memory of the client device 106, such as a secure data store 143 and an alternate data store 146. which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store.

A secure data store 143 is an application specific data store provided by the operating system to each application installed on the client device 106. Access to the respective secure data store 143 of an application is generally only permitted when an application is executing in the foreground or is in an unlocked state. For example, when a user opens the contact tracing application 126 and/or authenticates with the contact tracing application 126 to enable the contact tracing application 126 to execute in the foreground, the operating system can unlock or decrypt the secure data store 143 using an application specific encryption key and provide access to the secure data store 143 to the contact tracing application 126. When the user switches from the contact tracing application 126 to another client application 129, this can cause the contact tracing application 126 to execute in the background and/or enter a locked state that may require the user to authenticate with the contact tracing application 126 in order to enable it to execute in the foreground.

Any application can store any relevant data in its secure data store 143. For example, the contact tracing application 126 could store one or more encounter records 149a in its respective secure data store 143. Each encounter record 149 could represent an encounter of the client device 106 with a beacon 109. Accordingly, an encounter record 149 could include such information as the beacon identifier 153 of a beacon 109, a time stamp 156 representing a time in which the client device 106 was within range of the beacon 109, a signal strength 159 representing the strength of the radio signal of the beacon 109, the beacon location 163, and potentially other information about the encounter with the beacon 109.

Other client applications 129 can store other data in their respective secure data stores 143. For example, an email client could store passwords, certificates, and messages in its respective secure data store 143. A web browser could store website credentials, browser history, and other data in its secure data store 143. Meanwhile, a messaging or chat application could store chat histories or chat logs in its secure data store 143.

To provide for data storage while an application is executing in the background, the client device 106 can also implement an alternate data store 146. Data can be stored in the alternate data store by the operating system until such time as an application switches execution from the background to the foreground, at which point the application can move any data from the alternate data store 146 to a respective secure data store 143. To maintain confidentiality of data stored in the alternate data store 146, any data stored in the alternate data store 146 can be encrypted with a public key 133 of an application. An application identifier 139 can be stored with any encrypted data stored in the alternate data store 146, thereby allowing multiple applications to share access to the alternate data store 146 while maintaining the ability to identify which records in the alternate data store 146 are intended for a particular application.

For example, while the contact tracing application 126 is executing in the background, the client device 106 could detect encounters with beacons 109. This could occur, for example, if the user had his or her mobile device in his or her pocket while walking within the vicinity of a beacon 109. Because the contact tracing application 126 is executing in the background, it is unable to store an encounter record 149a in its respective secure data store 143. Accordingly, the contact tracing application 126 could create and store an encrypted encounter record 166 in the alternate data store 146. To do so, the contact tracing application 126 could create an encounter record 149b and use the public key 133a to encrypt the encounter record 149b. The contact tracing application 126 could also hash the encounter record 149b and include its application identifier 139 to enable to the contact tracing application 126 to locate encrypted encounter records 166 saved by the contact tracing application 126 with respect to data saved by other applications and to distinguish between or otherwise identify specific encrypted encounter records 166.

Beacons 109 can represent any device with a radio transmitter and a known location which transmit their beacon identifier 153 at periodic intervals. In some instances, the beacon 109 can also transmit the beacon location 163. The beacon identifier 153 can be any unique identifier that uniquely represents a beacon with respect to another beacon. Examples of beacon identifiers 153 include globally unique identifiers (GUIDS) or universally unique identifiers (UUIDs) assigned to a beacon 109, hardware identifiers assigned to the beacon 109 (e.g., a MAC or IMEI address), etc. Examples of beacons 109 include wireless access points, BLUETOOTH devices that transmit to nearby devices, and similar devices.

Next, a general description of the operation of the various components of the network environment 200 is provided. Although the following general description provides an example of the operation of the various embodiments, other implementations are also contemplated. Specific details about particular implementations are set forth in the discussion accompanying the subsequent flowcharts.

To begin, the contact tracing application 126 receives or obtains data or a message containing data that needs to be stored. For example, the contact tracing application 126 could be notified that an encounter with a beacon 109 has occurred. The contact tracing application 126 could then determine whether the secure data store 143 is available for storage.

If the secure data store 143 is unavailable, then the contact tracing application 126 can create an encrypted encounter record 166 to store in the alternate data store 146. For example, the contact tracing application 126 can generate an encounter record hash 169 based on the encounter record 149b. The contact tracing application 126 could then encrypt the encounter record 149b with the public key 133a to generate an encrypted encounter record 166 stored in association with the encounter record hash 169 and the application identifier 139a of the contact tracing application 126.

When the contact tracing application 126 begins execution in the foreground, such as when a user has authenticated with the contact tracing application 126 by providing a password or biometric identifier (e.g., a fingerprint, facial recognition, etc.), the contact tracing application 126 can then search for any records in the alternate data store 146 that have an application identifier 139 that matches the application identifier 139a of the contact tracing application 126. The contact tracing application 126 can then decrypt the encrypted encounter records 166 using the private key 136a of the contact tracing application 126 in order to access them. Once decrypted, each encounter record 149b can be stored in the secure data store 143. After storing copies of the encounter records 149b in the secure data store 143, the contact tracing application 126 can delete the encrypted encounter records 166 from the alternate data store 146.

However, if the contact tracing application 126 needs to access data stored in the alternate date store 146, it can do so. For example, if the contact tracing application 126 wants to display notifications about collected data (e.g., render a list of beacons 109 that within proximity to a beacon 109), the contact tracing application 126 can decrypt the encrypted encounter records 166 stored in the alternate data store 146.

As another example, if another client application 129, such as a mail application, wishes to show a preview of a messages it has received, it could search the alternate data store 146 for records with an application identifier 139b that match the client application 129. The client application 129 could then decrypt those records with the respective private key 136b in order to access them and display portions of them as previews of received messages.

Figure 2:
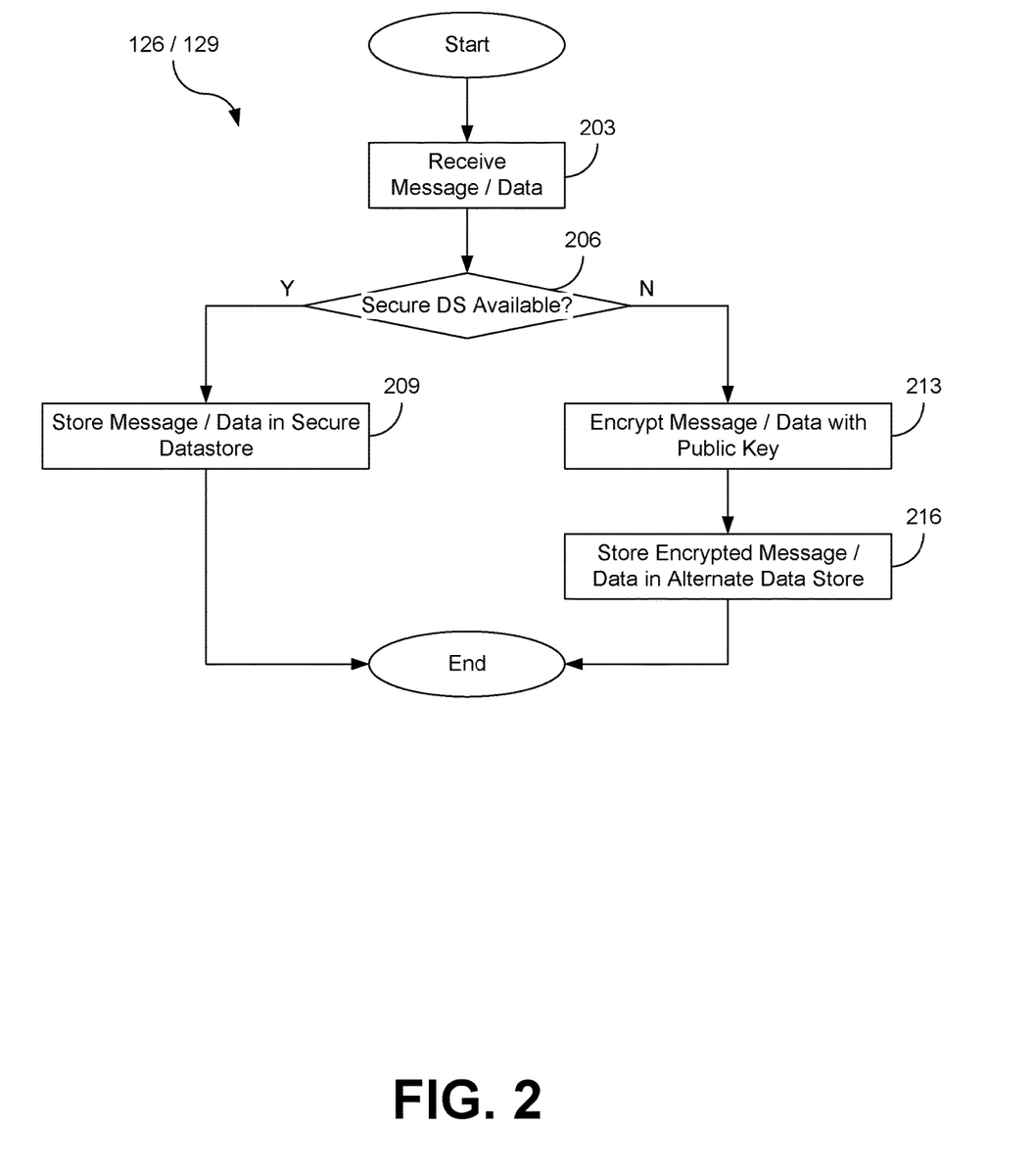
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of a client application 129, such as the contact tracing application 126. The flowchart of FIG. 2 provides merely an example of the many different types of functional arrangements that can be employed to implement the operation of the depicted portion of the client application 129, such as the contact tracing application 126. As an alternative, the flowchart of FIG. 2 can be viewed as depicting an example of elements of a method implemented within the network environment 100.

Beginning with step 203, a client application 129 such as the contact tracing application 126, receives a message or data to be stored. In the example of a contact tracing application 126, the message could be from the operating system to indicate that the client device 106 is in proximity to a beacon 109. Such a message could include information such as the beacon identifier 153, beacon location 163, signal strength 159 recorded by the operating system, and a timestamp 156. If the client application 129 were a mail or messenger client, the message or data to be stored could be an email or chat message.

Then at step 206, the client application 129, such as the contact tracing application 126, can determine whether the secure data store 143 is available. This can be accomplished in several ways. For example, the client application 129, such as the contact tracing application 126, can check to see if it is currently running in the foreground or the background. As another example, the client application 129, such as the contact tracing application 126, could attempt to write to the secure data store 143 and see if the write succeeds. As a third example, the client application 129, such as the contact tracing application 126, could query the operating system of the client device 106 to determine whether the secure data store 143 is available. If the secure data store 143 is available, then the process proceeds to step 209. If the secure data store 143 is unavailable, then the process proceeds to step 213.

If execution proceeds to step 209, then the client application 129 (e.g., the contact tracing application 126) can store the message or date received at step 203 in the secure data store 143. For example, the contact tracing application 126 could create and store in the secure data store 143 associated with the contact tracing application 126 an encounter record 149a based at least in part on data received at step 203 related to a beacon 109 in proximity to the client device 106. As another example, a client application 129 (e.g., an email application) could save an email received at step 203 in the secure data store 143 for the client application 129. Once the message or data is stored in the secure data store 143, the process can end.

However, if execution proceeds to step 213, then the message or data received at step 203 can be stored in the alternate data store 146 until the secure data store 143 becomes available. For example, the contact tracing application 126 could create an encounter record 149b based at least in part on data received at step 203 related to a beacon 109 in proximity to the client device 106. The contact tracing application 126 could then generate an encounter record hash 169 from the encounter record 149 and encrypt the encounter record 149 using a public key 133a. As a second example, a client application 129 (e.g., an email application) could similarly use a public key 133b to encrypt data or messages received at step 203 (e.g., emails).

Then, at step 216, the client application 129 (e.g., the contact tracing application 126) could store the data encrypted at step 213 in the alternate data store 146. For example, the encrypted data of the encounter record 149b and the encounter record hash 169 could be stored by the contact tracing application 126 in association with the application identifier 139a as an encrypted encounter record 166. The application identifier 139a would allow the contact tracing application 126 to subsequently identify the encrypted encounter record 166 as data stored by the contact tracing application 126 in the alternate data store, and the encounter record hash 169 would allow the contact tracing application 126 to identify a particular encrypted encounter record 166 as the encrypted version of an existing encounter record if a search of the alternate data store 146 were performed. As another example, a client application 129, such as an email application, could store the encrypted data or messages (e.g., emails) together with an application identifier 139b in the alternate data store 146. Once the data is stored in the alternate data store 146, the process can end.

Figure 3:
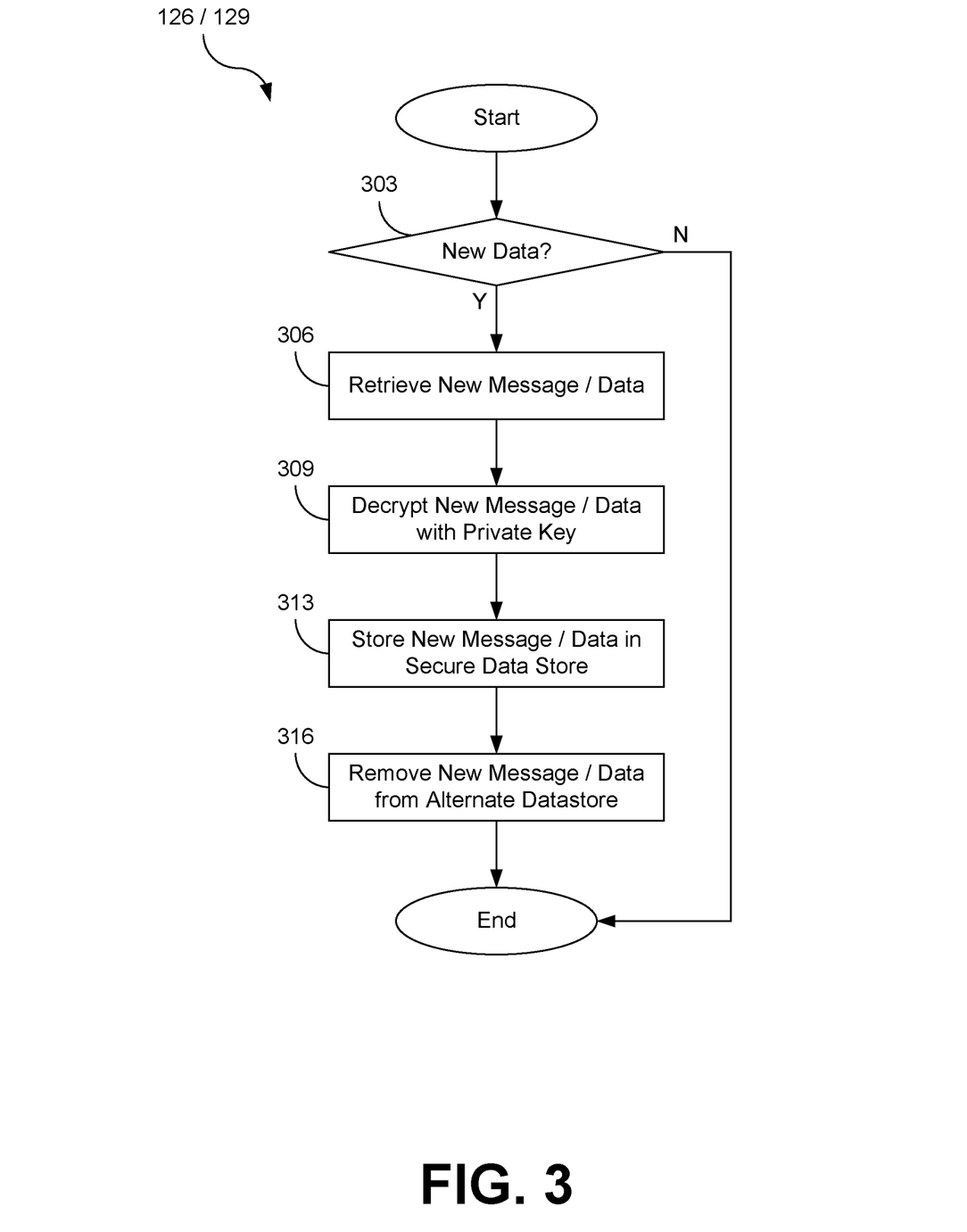
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of a client application 129, such as the contact tracing application 126. The flowchart of FIG. 3 provides merely an example of the many different types of functional arrangements that can be employed to implement the operation of the depicted portion of the client application 129, such as the contact tracing application 126. As an alternative, the flowchart of FIG. 3 can be viewed as depicting an example of elements of a method implemented within the network environment 100.

Beginning with step 303, the client application 129 (e.g., contact tracing application 126) can check to see if new data has been stored in the alternate data store 146. Such a check could be performed, for example, when a client application 129, such as the contact tracing application 126, switches execution states from background execution to foreground execution. The presence of new records or date in the alternate data store 146 could be determined, for example, by searching for records in the alternate data store 146 with an application identifier 139 of the respective client application 129, such as encrypted encounter records 166 or other data stored in associate with an application identifier 139a of the contact tracing application 126. If such data is present, then the process proceeds to step 306. If such records are not present, then the process can end.

Then at step 306, the client application 129 (e.g., the contact tracing application 126) and retrieve records or other data (e.g., encrypted encounter records) stored in the alternate data store 146. This could be done, for example, by searching for records, messages, or data stored in associate with an application identifier 139 associated with the client application 129, such as the application identifier 139a associated with the contact tracing application 126.

Next, at step 309, the client application 129 (e.g., the contact tracing application 126) can decrypt the records or data retrieved at step 306. For example, the contact tracing application 126 could decrypt the encrypted encounter records 166 retrieved at step 306 using the private key 136a of the contact tracing application 126, thereby recreating or otherwise making accessible the encounter records 149b in unencrypted form. Similarly, a client application 129, such as an email client or chat application, could decrypt emails or chat messages stored in the alternate data store 146 using a respective private key 136b.

Proceeding to step 313, the client application 129 (e.g., the contact tracing application 126) can store the decrypted data in a respective secure data store 143. For example, the contact tracing application 126 could store in the secure data store 143 for the contact tracing application 126 one or more encounter records 149a that were previously decrypted at step 309. Likewise, a client application 129, such as an email client, could store emails decrypted at step 306 in a respective secure data store 143 dedicated to the client application 129.

Moving on to step 316, the client application 129 (e.g., the contact tracing application 126) can remove from the alternate data store 146 the messages or data previously retrieved at step 306. This can be done both as a security measure to prevent other applications or processes from potentially accessing the records temporarily stored in the alternate data store 146, but also to facilitate tracking of which records in the alternate data store 146 need to be moved to the secure data store 143. Once the records or data is removed, the process can end.

Figure 4:
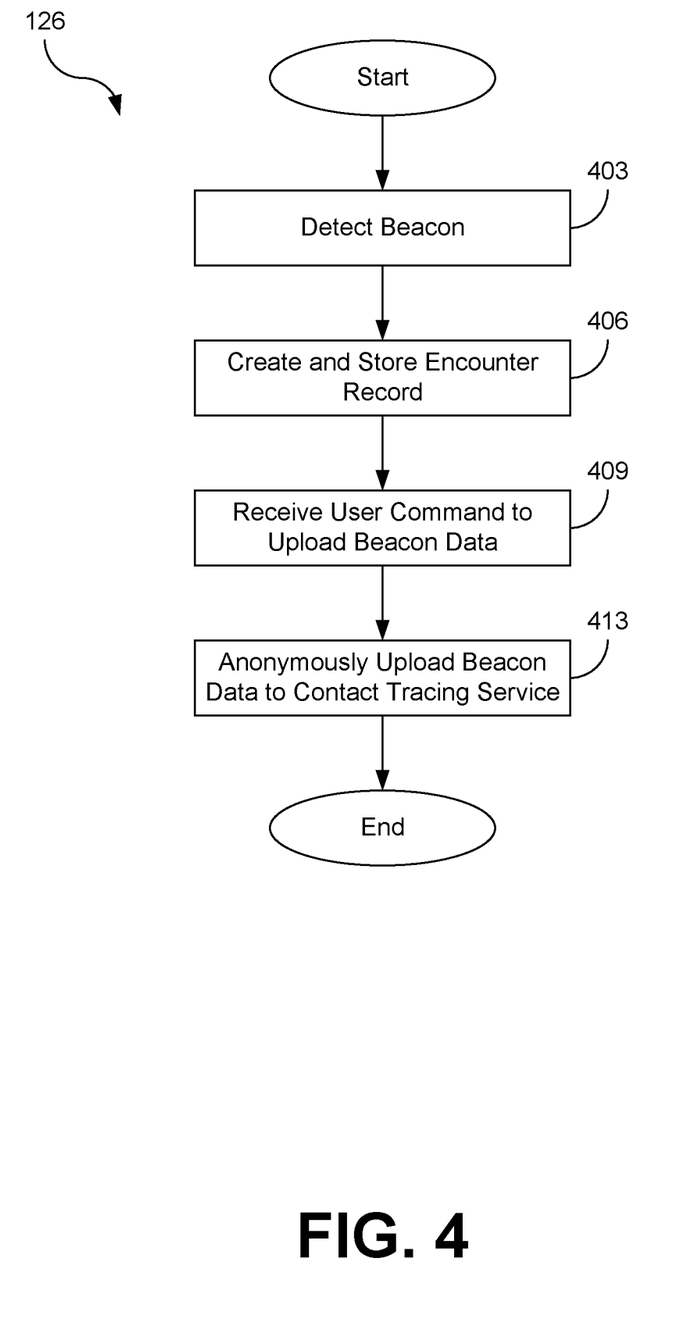
FIG. 4 is a flowchart illustrating one example of functionality implemented as portions of an application executed in a computing environment in the network environment of FIG. 1 according to various embodiments of the present disclosure.

Referring next to FIG. 4, shown is a flowchart that provides one example of the operation of a portion of the contact tracing application 126. The flowchart of FIG. 4 provides merely an example of the many different types of functional arrangements that can be employed to implement the operation of the depicted portion of the contact tracing application 126. As an alternative, the flowchart of FIG. 4 can be viewed as depicting an example of elements of a method implemented within the network environment 100.

Beginning with step 403, the contact tracing application 126 can determine that the client device 106 is in the presence of a beacon 109. For example, the operating system of the client device 106 could provide a message or notification to the contact tracing application 126 indicating that the client device 106 was within range of a beacon 109. The message could include the beacon identifier 153, the beacon location 163, a signal strength 159 of the beacon 109 as measured by the client device 106, a timestamp 156 reflecting when the client device made the measurement of the signal strength 159 or otherwise detected the beacon 109, and potentially other information.

Then at step 406, the contact tracing application 126 can create an encounter record 149. The encounter record 149 can contain the information received at step 403 regarding the beacon 109. The encounter record 149 can be stored for future reference using approaches such as those previously described with respect to the flowcharts of FIG. 2 and/or FIG. 3.

Next at step 409, the contact tracing application 126 can receive a user command to upload encounter records 149 or other beacon data to the contact tracing service 116. The user might be motivated to provide such a command in response to receiving a positive test result for an infectious or communicable disease. Should the user choose to provide such a command, each encounter record 149 stored on the client device 106 with a timestamp falling within a predefined preceding time period can be provided to the contact tracing service 116. The predefined preceding time period could be based on a number of factors. For example, it could be a user specified preceding time period. As another example, the preceding time period could be predefined based on a known incubation period.

Finally, at step 413, the contact tracing application 126 can anonymously upload the encounter records 149 to the contact tracing service 116. For example, each encounter record 149 could be stripped of any uniquely identifying information (e.g., device identifiers, user identifiers, etc.). Further, each encounter record 149 could be uploaded as a single, discrete event in order to inhibit third-parties from associating multiple encounter records 149 with each other. Each of these encounter records 149 could then be relayed by the contact tracing service 116 to a respective client device with an enrolled contact tracing application 126 as a potential instance of exposure, without identifying the identities of the infected individual or the persons who were exposed.

Figure 5:
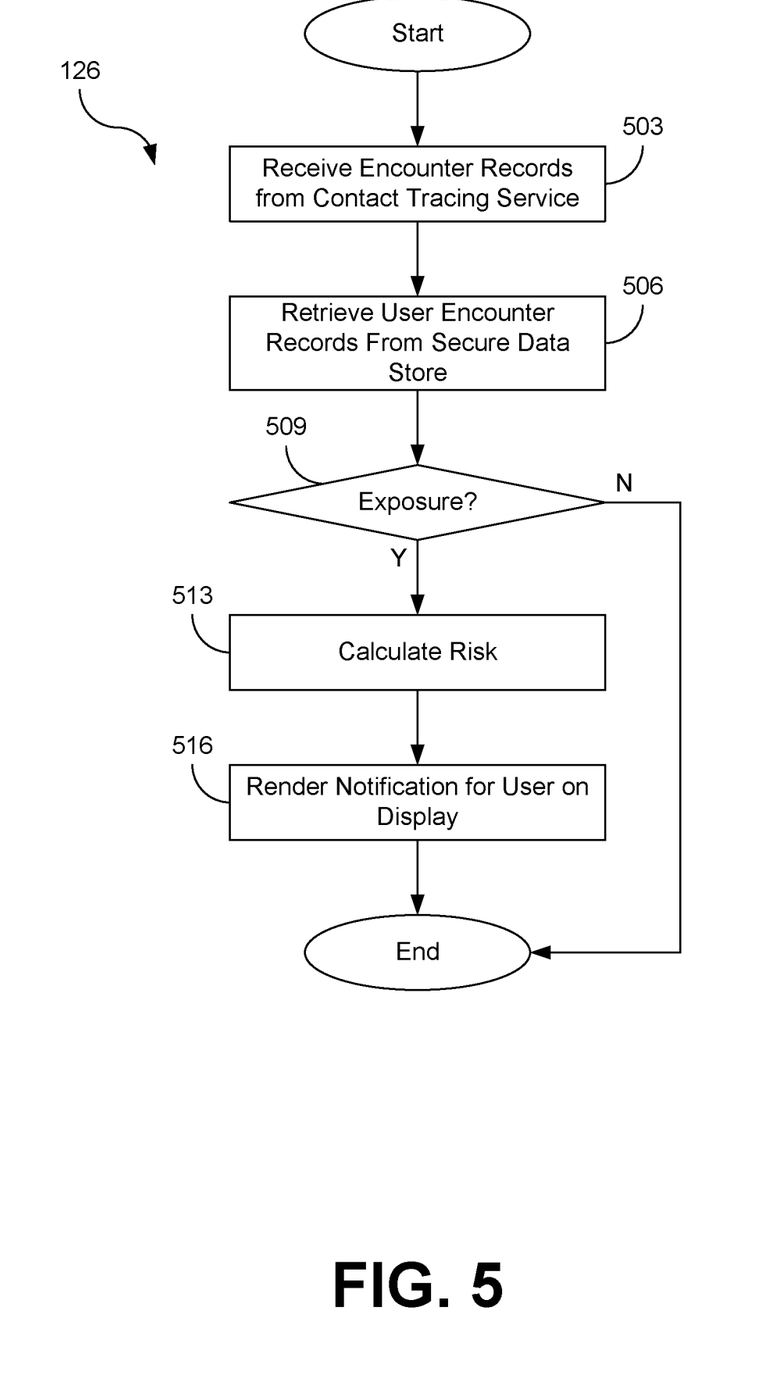
FIG. 5 is a flowchart illustrating one example of functionality implemented as portions of an application executed in a computing environment in the network environment of FIG. 1 according to various embodiments of the present disclosure.

Referring next to FIG. 5, shown is a flowchart that provides one example of the operation of a portion of the contact tracing application 126. The flowchart of FIG. 5 provides merely an example of the many different types of functional arrangements that can be employed to implement the operation of the depicted portion of the contact tracing application 126. As an alternative, the flowchart of FIG. 5 can be viewed as depicting an example of elements of a method implemented within the network environment 100.

Beginning with step 503, the contact tracing application 126 can receive beacon data related to potentially infected individuals, such as one or more encounter records 149, from the contact tracing service 116. Because each encounter record 149 can be separately received as a distinct event, the contact tracing application 126 is unable to determine whether multiple encounter records 149 were generated by a single individual or by multiple individuals, thereby preserving the privacy of infected individuals who volunteered to share their data.

Then, at step 506, the contact tracing application 126 can retrieve encounter records 149 stored locally on the client device 106 from the secure data store 143 and/or the alternate data store 146. The contact tracing application 126 may use approaches such as those previously described with respect to FIG. 2 or FIG. 3 to retrieve the locally stored encounter records 149.

Next at step 509, the contact tracing application 126 can calculate whether the use of the client device 106 was potentially exposed to an infectious disease. This can be done by comparing individual encounter records 149 stored on the client device 106 with those encounter records 149 received at step 503. If there is an overlap in the time and locate of two encounter records 149, which might indicate that the user of the client device 106 was at the same location at the same time as an infected individual, then the contact tracing application 106 can determine that the user of the client device 106 was exposed. Other factors beyond time and location may also be considered in various embodiments of the present disclosure, such as the relative proximity of the two individuals to a particular beacon 109. This could be determined, for example, by comparing the signal strengths 159 recorded in the respective encounter records 149. If no potential exposure is detected, then the process can end. If there was a potential exposure, then the process can proceed to step 513.

Moving on to step 513, the contact tracing application 126 can attempt to calculate the potential risk of exposure. This could be based on a number of factors, such as whether the pathogen is airborne, the infectivity of the pathogen (as indicated by the Ro variable for the pathogen), and potentially other factors.

Finally, at step 516, the contact tracing application 126 can display a notification to the user of the client device 106 alerting him or her to the potential exposure. The notification may simply state that the user was exposed, but without providing specific details such as when or where exposure occurred in order to protect the privacy of infected individuals. In some implementations, the time and location of the exposure could be provided to the user, at the risk of deanonymizing infected individuals (e.g., where exposure occurred in a close environment with a limited number of people, such that the identity of the infected individual could be easily deduced). Moreover, some implementations may inform the user of his or her risk of catching the pathogen from the infected individual based on the analysis performed at step 513. Once the notification is displayed to the user, the process can then end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system for anonymized contact tracing, comprising:
a computing device comprising a processor and a memory;
a secure database contained in the memory, the secure database being encrypted by an application specific encryption key;
an alternate database contained in the memory; and
an application comprising machine-readable instructions stored in the memory that, when executed by the processor, cause the computing device to at least:
receive a message containing data, wherein the message is received by the application while the application is executing in a background state;
encrypt the data in the message using a public key accessible to the application to generate encrypted data;
store the encrypted data in the alternate database;
authenticate a user of the computing device;
switch execution of the application to a foreground state in response to authentication of the user;
decrypt the secure database using the application specific encryption key in response to switching execution of the application to the foreground state;
decrypt the encrypted data using a respective private key for the public key to generate decrypted data and store the decrypted data in the decrypted secure database;
receive user input indicating a positive test result for a communicable disease, the communicable disease having an incubation period; and
anonymously upload, in response to receiving the user input, a plurality of the decrypted data from the secure database to a contract tracing service as a single discreet event, the plurality of the decrypted data being selected based at least in part on the incubation period for the communicable disease,
wherein each decrypted datum of the plurality of the decrypted data is stripped of any uniquely identifying information such that an uploading user is indeterminate from the plurality of the decrypted data.

2. The system of claim 1, wherein the computing device further comprises a radio receiver and the machine-readable instructions are further configured to cause the computing device to at least:
detect that the computing device is in proximity to a beacon;
record a beacon identifier, a timestamp reflecting when the computing device is detected as being in proximity to the beacon, and a signal strength associated with the beacon; and
send the message to the application, wherein the data in the message comprises the beacon identifier, the timestamp, and the signal strength.

3. The system of claim 1, wherein the machine-readable instructions that cause the computing device to store the encrypted data in the alternate database further cause the computing device to at least:
generate a hash of the data;
store the hash in the alternate database in association with the encrypted data; and
store an application identifier of the application in the alternate database in association with the encrypted data.

4. The system of claim 3, wherein the machine-readable instructions further cause the computing device to at least:
search the alternate database for the encrypted data using the hash of the data;
and
render a notification on a display of the computing device containing the decrypted data.

5. The system of claim 1, wherein the machine-readable instructions further cause the computing device to at least delete the encrypted data from the alternate database in response to the decrypted data being stored in the decrypted secure database.

6. The system of claim 1, wherein the machine-readable instructions further cause the computing device to at least search for the encrypted data in the alternate database using an application identifier associated with the application in response to the application switching execution to the foreground state.

7. The system of claim 1, wherein the data in the message comprises an email.

8. A method for anonymized contact tracing, comprising:
receiving a message containing data, wherein the message is received by an application while the application is executing in a background state;
encrypting the data in the message using a public key accessible to the application to generate encrypted data;
storing the encrypted data in an alternate database;
authenticating a user of a computing device;
switching execution of the application to a foreground state in response to authentication of the user;
decrypting a secure database using an application specific encryption key in response to switching execution of the application to the foreground state;
decrypting the encrypted data using a respective private key for the public key to generate decrypted data;
storing the decrypted data in the decrypted secure database,
receiving user input indicating a positive test result for a communicable disease,
the communicable disease having an incubation period; and
anonymously uploading, in response to receiving the user input, a plurality of the decrypted data from the secure database to a contract tracing service as a single discreet event, the plurality of the decrypted data being selected based at least in part on the incubation period for the communicable disease,
wherein each decrypted datum of the plurality of the decrypted data is stripped of any uniquely identifying information such that an uploading user is indeterminate from the plurality of the decrypted data.

9. The method of claim 8, further comprising:
detecting that the computing device is in proximity to a beacon;

recording a beacon identifier, a timestamp reflecting when the computing device is detected as being in proximity to the beacon, and a signal strength associated with the beacon; and sending the message to the application, wherein the data in the message comprises the beacon identifier, the timestamp, and the signal strength.

10. The method of claim 8, further comprising:

generating a hash of the data;

storing the hash in the alternate database in association with the encrypted data; and storing an application identifier of the application in the alternate database in association with the encrypted data.

11. The method of claim 10, further comprising:

searching the alternate database for the encrypted data using the hash of the data;

and rendering a notification on a display of the computing device containing the decrypted data.

12. The method of claim 8, further comprising deleting the encrypted data from the alternate database in response to the decrypted data being stored in the decrypted secure database.

13. The method of claim 8, further comprising searching for the encrypted data in the alternate database using an application identifier associated with the application in response to the application switching execution to the foreground state.

14. The method of claim 8, wherein the data in the message comprises an email.

15. A non-transitory, computer-readable medium for anonymized contact tracing, comprising machine-readable instructions that, when executed by a processor of a computing device, cause the computing device to at least:

receive a message containing data, wherein the message is received by an application while the application is executing in a background state;

encrypt the data in the message using a public key accessible to the application to generate encrypted data;

store the encrypted data in an alternate database;

authenticate a user of the computing device;

switch execution of the application to a foreground state in response to authentication of the user;

decrypt a secure database using an application specific encryption key in response to switching execution of the application to the foreground state;

decrypt the encrypted data using a respective private key for the public key to generate decrypted data;

store the decrypted data in the decrypted secure database;

receive user input indicating a positive test result for a communicable disease, the communicable disease having an incubation period; and anonymously upload, in response to receiving the user input, a plurality of the decrypted data from the secure database to a contract tracing service as a single discreet event, the plurality of the decrypted data being selected based at least in part on the incubation period for the communicable disease, wherein each decrypted datum of the plurality of the decrypted data is stripped of any uniquely identifying information such that an uploading user is indeterminate from the plurality of the decrypted data.

16. The non-transitory, computer-readable medium of claim 15, wherein the computing device further comprises a radio receiver and the machine-readable instructions are further configured to cause the computing device to at least:

detect that the computing device is in proximity to a beacon;

record a beacon identifier, a timestamp reflecting when the computing device is detected as being in proximity to the beacon, and a signal strength associated with the beacon; and send the message to the application, wherein the data in the message comprises the beacon identifier, the timestamp, and the signal strength.

17. The non-transitory, computer-readable medium of claim 15, wherein the machine-readable instructions that cause the computing device to store the encrypted data in the alternate database further cause the computing device to at least:

generate a hash of the data;

store the hash in the alternate database in association with the encrypted data; and store an application identifier of the application in the alternate database in association with the encrypted data.

18. The non-transitory, computer-readable medium of claim 17, wherein the machine-readable instructions further cause the computing device to at least:

search the alternate database for the encrypted data using the hash of the data;

and render a notification on a display of the computing device containing the decrypted data.

19. The non-transitory, computer-readable medium of claim 15, wherein the machine-readable instructions further cause the computing device to at least delete the encrypted data from the alternate database in response to the decrypted data being stored in the decrypted secure database.

20. The non-transitory, computer-readable medium of claim 15, wherein the machine-readable instructions further cause the computing device to at least search for the encrypted data in the alternate database using an application identifier associated with the application in response to the application switching execution to the foreground state.

* * * * *